United States Patent [19]
Gerling

[11] 3,708,216
[45] Jan. 2, 1973

[54] ADJUSTABLE BEARING

[75] Inventor: Paul Gerling, Essen, Germany

[73] Assignee: Glyco-Metall-Werke Daelen & Lovs GmbH, Wiesbaben-Schierstein, Germany

[22] Filed: July 27, 1971

[21] Appl. No.: 166,497

[30] Foreign Application Priority Data

July 28, 1970  Germany.....................P 20 37 440.7

[52] U.S. Cl....................................................308/73
[51] Int. Cl.............................................F16c 17/06
[58] Field of Search.................308/58, 60, 61, 63, 73

[56] References Cited

UNITED STATES PATENTS

| | | | |
|---|---|---|---|
| 953,216 | 3/1910 | Mix | 308/63 |
| 2,538,746 | 1/1951 | Dall | 308/73 |
| 3,297,371 | 1/1967 | Salzman | 308/73 |
| 3,318,643 | 5/1967 | Pilarczyk | 308/73 |
| 3,472,566 | 10/1969 | Kunderman | 308/73 |
| 3,604,768 | 9/1971 | Decker | 308/73 |

*Primary Examiner*—Milton Kaufman
*Assistant Examiner*—Barry Grossman
*Attorney*—Walter Becker

[57] ABSTRACT

An adjustable bearing with at least three radial segments arranged within and bearing against the housing of the bearing and adjustable relative to the housing by positioning ring means, the segments being pivotally supported by said positioning ring means.

8 Claims, 3 Drawing Figures

ADJUSTABLE BEARING

The present invention relates to an adjustable bearing which comprises a housing, at least three radial segments resting against said housing, and an adjusting device engaging said radial segments and in mutually operative relationship thereto. Bearings of this type, also known as radial segment bearings are customarily employed wherever it is necessary to adjust the bearing play and stability of the finished bearing and, as the case may be, so as to meet optimum conditions in operation. To this end, with heretofore known adjustable bearings, screw bolts are in most instances used as adjusting means, which screw bolts are guided in the housing by radial shafts and are connected to the radial segments. The support of the radial segments on the housing is realized by the screw bolts. Such an arrangement however is disadvantageous because the screw bolts have to absorb the forces. On the other hand, the adjustment is awkward and cumbersome as much as the individual radial segments have to be adjusted one after another. Finally, adjusting tolerances between the individual radial segments cannot be excluded, and this fact affects the running characteristics and life of the bearing means.

It is therefore an object of this invention so to improve an adjustable bearing of the above mentioned general type that the adjustment of the radial segments will be possible in a simple manner and at high precision.

It is another object of this invention to provide an adjustable bearing as set forth in the preceding paragraph, which will be simple in construction and relatively inexpensive.

These and other objects and advantages of the invention will appear more clearly from the following description in connection with the accompanying drawings in which.

The adjustable bearing according to the invention, which has at least three radial segments resting against the housing of the bearing and also has adjusting means is characterized primarily in that the adjusting means includes rotatable adjusting rings in or on the housing while said radial segments are loosely mounted between said adjusting rings, and is furthermore characterized in that said housing is provided with control surfaces for radially adjusting the radial segments by rotating the adjusting rings.

Further according to a more specific embodiment of the invention, there is provided an adjustable bearing comprising ring means rotatable relative to the housing, a plurality of bearing segments pivoted on the ring means with freedom for limited radial movement relative thereto, and a control surface bearing against the segments, and effective to adjust the limits of the radial movement of the segments upon relative rotation between the ring means and the housing.

According to a preferred embodiment of the invention, the positioning rings are each mounted on an end-face of the housing and are held together by connecting bolts. The radial segments themselves are by means of pivot pins mounted with radial play between the positioning rings. The shape of the control surfaces is governed by the kinematics desired for the motion by which the radial segments are to be adjusted. In one form, which has been tested and found to be reliable in operation, the control surfaces are arcuate and have a radius of curvature greater than the distance between the control surface and the longitudinal axis of the bearing, whereby the segments are self-locking. The outer surfaces of the radial segments, which surfaces are convex or ridged, bear directly against the control surfaces, and the segments are preferably spherically mounted on their pivot pins.

Preferably, to rotate the positioning rings in relation to the housing, a setting device is provided between the positioning rings and the housing, and comprises a spindle mounted in the housing and acting on the rings in such a way that when the spindle is turned the positioning rings rotate.

Figure 1:
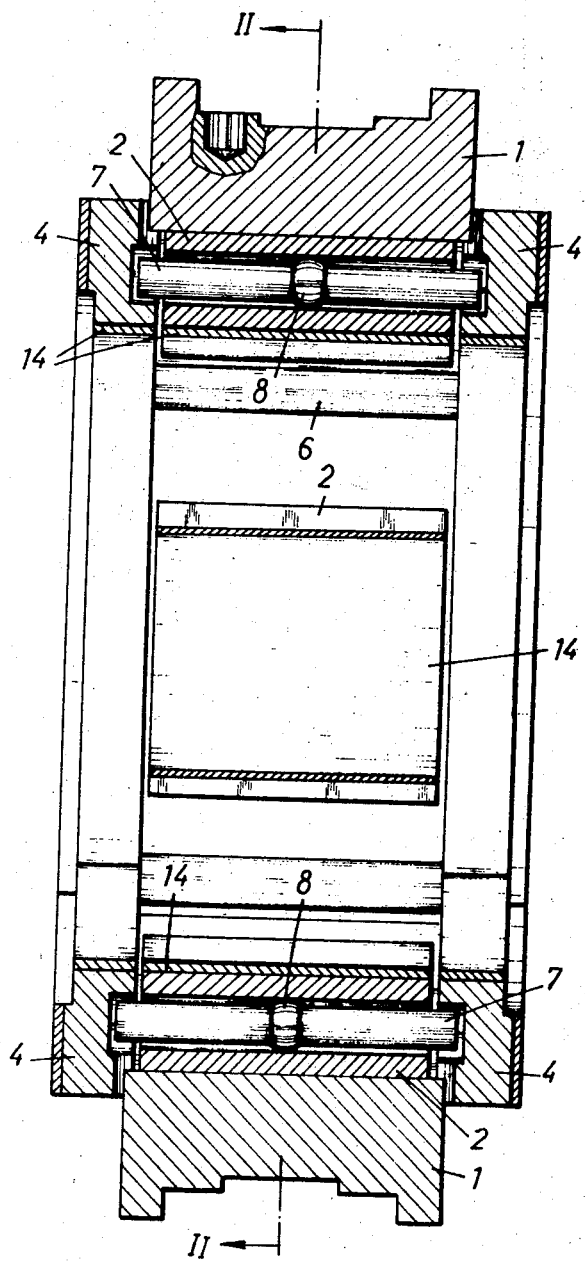
FIG. 1 is an axial section through an adjustable bearing according to the present invention.

Referring now to the drawings in detail, the adjustable bearing shown therein is a radial segment bearing which comprises an annular sectional housing 1 and four radial segments 2 resting or bearing against the housing 1. The radial segments 2 have an adjusting device consisting of positioning rings 4 arranged to rotate on or in the housing 1, the arrows 3 in FIG. 2 indicating their range of adjustment. The radial segments 2 are loosely pivotable between the positioning rings 4. Each radial segment 2 has associated therewith a respective control surface 5 formed by the inner periphery of the housing 1, which control surface causes the segment 2 to undergo radial displacement when the positioning rings 4 are rotated. In the embodiment illustrated, a respective positioning ring 4 (FIG. 1) is mounted on each axial end-face of the housing 1, and these two rings 4 are connected to each other by bolts 6. The radial segments 2 are by means of pivot pins 7 mounted between the positioning rings 4 with freedom for at least limited radial movement relative thereto; the radial segments 2 being mounted on the pivot pins 7 by a partially spherical member 8.

Figure 2:
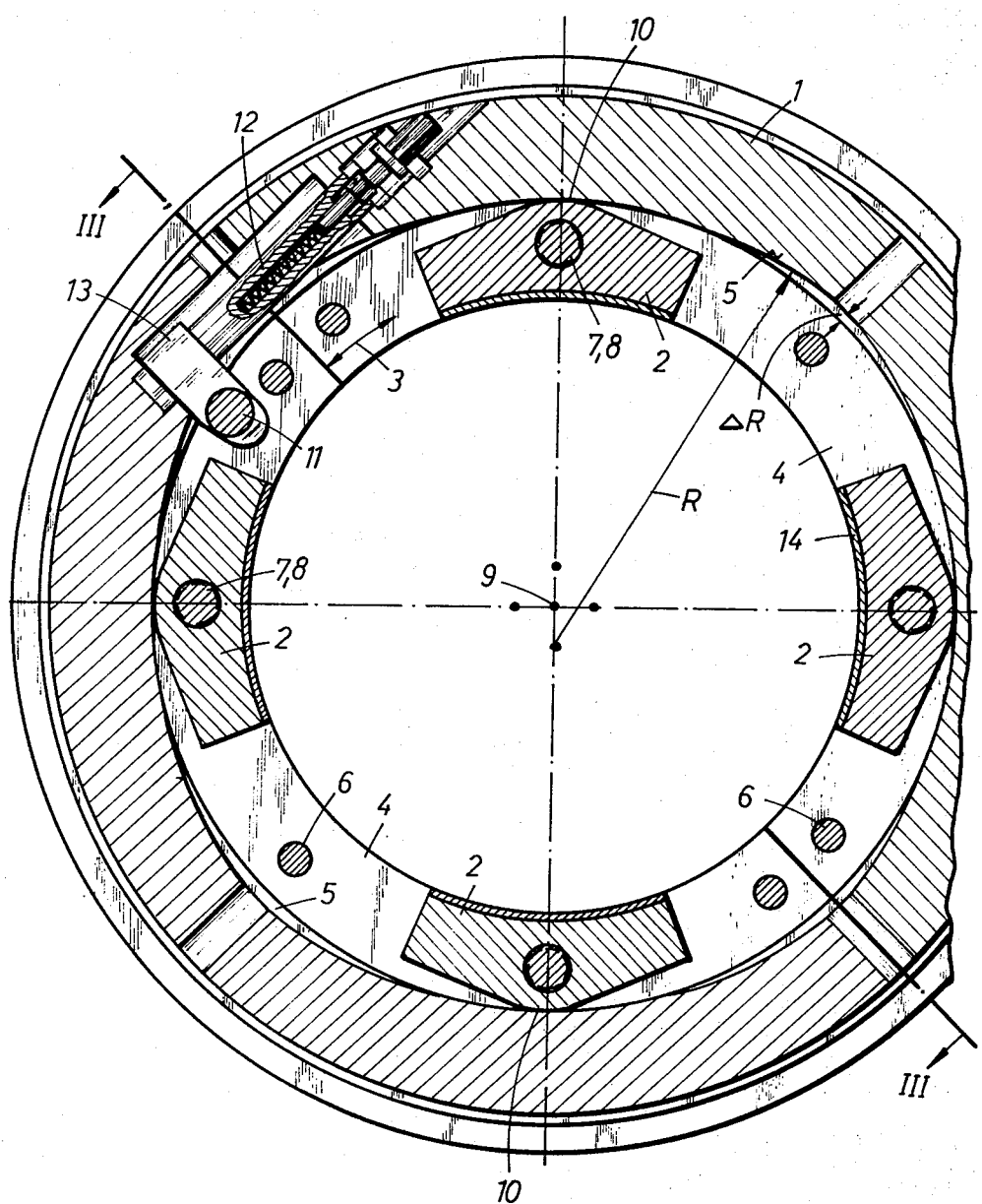
FIG. 2 is a section taken along the line II—II of FIG. 1.
Figure 3:
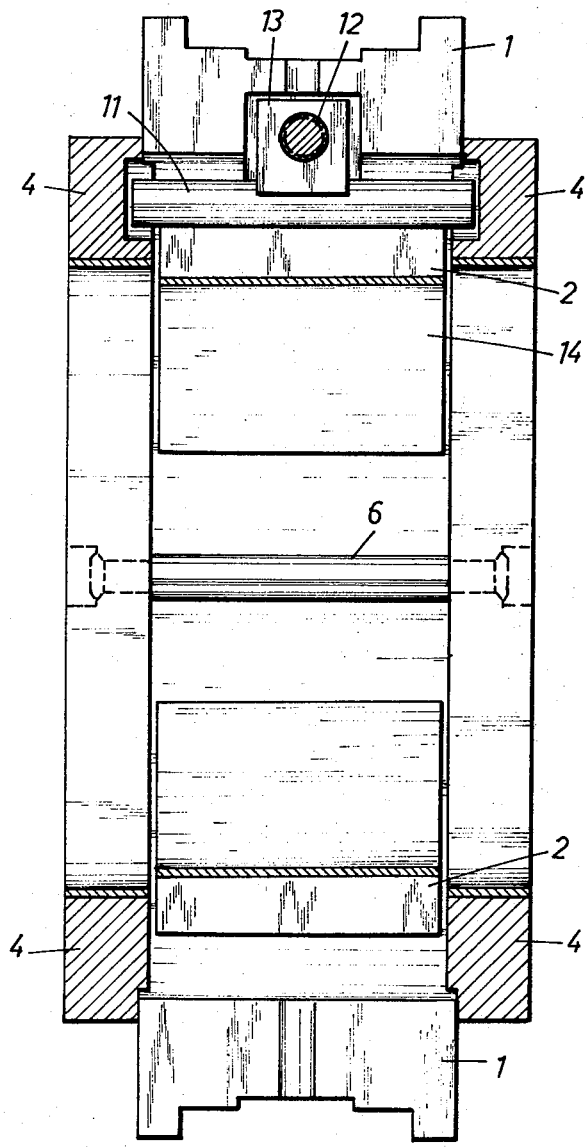
FIG. 3 is a section taken along the line III—III of FIG. 2.

As is shown in FIG. 2, the control surfaces 5 shown in a section orthogonal with regard to the axis 9 of the bearing constitute arcs of circles. These arcs have a radius of curvature R which is greater than the distance of the control surfaces 5 from the longitudinal axis 9 of the bearing. By varying the magnitude of $\Delta R$ (FIG. 2) the adjusting behavior of the bearing according to the invention can be constructively controlled. The backs or outer surfaces 10 of the radial segments 2, are ridge-shaped but flattened and bear directly against the control surfaces 5. The radial segments 2 may be faced with babbitt metal 14.

To adjust the positioning rings 4, a setting device is interposed between the rings 4 and the housing 1. The setting device comprises a spindle 12 guided in the housing 1 and in mutually operative relationship with the rings 4 through a lever 11. When the spindle 12 is rotated, a spindle nut 13 is moved, and this movement is communicated to the positioning rings 4 by the lever 11 whereby rings 4 are moved. The amount of set can readily be adapted to the conditions arising in practice. When the radial segments 2 are in the position shown in the drawings, the play in the bearings is at its minimum.

Rotation of the positioning rings 4 in either sense increases the bearing play. This can be carried out in the course of the assembly of the bearing or even during use of the bearing thereby providing optimum bearing play and stability.

The position of the radial segments 2 shown in FIG. 2 defines the minimum bearing play for the bearing shown. This bearing play may be increased by adjusting the setting rings toward the left or toward the right from said first mentioned position.

In the bearing described simultaneous precise adjustment of the radial segments is readily obtained. All the segments are adjusted at the same time, no matter whether the adjustable bearing has three such segments or more. Differences of adjustment between the various segments cannot occur. The co-ordination of the radial segments, in fact, has all the precision of the bearing as a whole. There is no difficulty in providing control surfaces shaped to give any desired fineness of adjustment.

It is, of course, to be understood that the present invention is, by no means, limited to the particular showing in the drawings but also comprises any modifications within the scope of the appended claims.

What I claim is:

1. An adjustable bearing comprising: a housing, at least three radial segments arranged within and bearing against said housing, adjusting means including positioning rings associated with and rotatable relative to said housing, pivot means positioned between and supported by said positioning rings and pivotally supporting said radial segments, said housing having control surfaces for radial adjustment of said segments in response to a rotation of said positioning rings.

2. A bearing according to claim 1, in which the positioning rings are respectively mounted on opposite end faces of said housing, and bolt means interconnecting said positioning rings, said radial segments being mounted on said pivot means with radial play.

3. A bearing according to claim 1, in which the control surfaces are arcuate and have a radius of curvature greater than the distance between the control surfaces and the axis of said bearing.

4. A bearing according to claim 1, in which the outer surfaces of said radial segments are convex and have ridge means bearing directly against said control surfaces.

5. A bearing according to claim 1, in which said adjusting means includes a setting device operable to rotate the positioning rings relative to the housing, said setting device being provided between said positioning rings and said housing.

6. A bearing according to claim 5, in which said setting device comprises a spindle arranged in said housing, said bearing also includes a nut threadedly engaged by said spindle, and transmitting means connecting said nut to said positioning rings, said setting device being operable to act upon said positioning rings through said spindle nut.

7. An adjustable bearing comprising a housing, ring means rotatable relative to said housing, a plurality of bearing segments pivotably supported by said ring means with freedom for limited radial movement relative thereto, said housing being provided with control surface means bearing against said segments and operable to adjust the limits of the radial movement of said segments upon relative rotation between said ring means and said housing.

8. A bearing according to claim 7, wherein said housing is annular in section and in which said control surface means are defined by the inner periphery of said housing.

* * * * *